(12) United States Patent
Fujimoto et al.

(10) Patent No.: US 11,578,775 B2
(45) Date of Patent: Feb. 14, 2023

(54) BRAKE LINING FOR RAILWAY VEHICLE, DISC BRAKE SYSTEM FOR RAILWAY VEHICLE INCLUDING SAME, AND SINTERED FRICTION MATERIAL TO BE USED FOR BRAKE LINING FOR RAILWAY VEHICLE

(71) Applicants: NIPPON STEEL CORPORATION, Tokyo (JP); FINE SINTER CO., LTD., Kasugai (JP)

(72) Inventors: Takahiro Fujimoto, Tokyo (JP); Manabu Kubota, Tokyo (JP); Takanori Kato, Tokyo (JP); Atsushi Sakaguchi, Tokyo (JP); Naruo Miyabe, Tokyo (JP); Takeshi Nakano, Kasugai (JP); Tokitake Okahira, Kasugai (JP); Isao Shimazoe, Kasugai (JP)

(73) Assignees: NIPPON STEEL CORPORATION, Tokyo (JP); FINE SINTER CO., LTD., Kasugai (JP)

( * ) Notice: Subject to any disclaimer, the term of this patent is extended or adjusted under 35 U.S.C. 154(b) by 24 days.

(21) Appl. No.: 16/770,427

(22) PCT Filed: Dec. 14, 2018

(86) PCT No.: PCT/JP2018/046112
§ 371 (c)(1),
(2) Date: Jun. 5, 2020

(87) PCT Pub. No.: WO2019/117289
PCT Pub. Date: Jun. 20, 2019

(65) Prior Publication Data
US 2021/0180660 A1    Jun. 17, 2021

(30) Foreign Application Priority Data
Dec. 15, 2017    (JP) .............................. JP2017-240843
Nov. 29, 2018    (JP) .............................. JP2018-223162

(51) Int. Cl.
*F16D 69/02*    (2006.01)
*B61H 5/00*    (2006.01)
(Continued)

(52) U.S. Cl.
CPC ............. *F16D 69/027* (2013.01); *B61H 5/00* (2013.01); *F16D 55/226* (2013.01);
(Continued)

(58) Field of Classification Search
CPC ............... F16D 69/027; F16D 69/0408; F16D 65/0972; F16D 2250/0084;
(Continued)

(56) References Cited

U.S. PATENT DOCUMENTS 9,394,953 B2 * 7/2016 Kato ...................... F16D 55/22
2015/0369320 A1  12/2015 Onda et al.
(Continued)

FOREIGN PATENT DOCUMENTS

CN    103302283 A    9/2013
JP    10226842 A     8/1998
(Continued)

OTHER PUBLICATIONS

Transactions of the Japan Society of Mechanical Engineers Series A, vol. 71, Issue 709, No. 03-1224.
(Continued)

*Primary Examiner* — Pamela Rodriguez
(74) *Attorney, Agent, or Firm* — Greer, Burns & Crain, Ltd.

(57) ABSTRACT

There is provided a brake lining for a railway vehicle that can reduce brake squeal in braking. A brake lining for a railway vehicle is used for a disc brake system of a railway vehicle. This brake lining includes a base plate, a sintered friction material, and a friction material supporting mechanism. The friction material supporting mechanism is dis-
(Continued)

posed between the base plate and the sintered friction material and supports the sintered friction material in such a manner that the sintered friction material can move with respect to the base plate. The sintered friction material has a Young's modulus of 35.0 GPa or more.

10 Claims, 6 Drawing Sheets

(51) Int. Cl.
*F16D 55/226* (2006.01)
*F16D 65/097* (2006.01)
*F16D 69/04* (2006.01)

(52) U.S. Cl.
CPC ..... *F16D 65/0972* (2013.01); *F16D 69/0408* (2013.01); *F16D 2069/0433* (2013.01); *F16D 2200/003* (2013.01); *F16D 2200/006* (2013.01); *F16D 2200/0086* (2013.01); *F16D 2250/0084* (2013.01)

(58) Field of Classification Search
CPC ....... F16D 2200/003; F16D 2069/0433; F16D 2200/006; F16D 2200/0086; F16D 55/26; B61H 5/00
See application file for complete search history.

(56) References Cited

U.S. PATENT DOCUMENTS

| | | | |
|---|---|---|---|
| 2016/0047016 A1* | 2/2016 | Katsuki | C22C 1/0425 |
| | | | 75/247 |
| 2017/0175839 A1 | 6/2017 | Sato et al. | |
| 2018/0259018 A1 | 9/2018 | Fujimoto et al. | |
| 2019/0078629 A1* | 3/2019 | Sakayama | B61H 5/00 |
| 2019/0292634 A1* | 9/2019 | Kubota | C22C 32/0005 |
| 2020/0038959 A1* | 2/2020 | Kubota | C22C 32/0084 |
| 2021/0041002 A1* | 2/2021 | Yasuda | C22C 32/0084 |

FOREIGN PATENT DOCUMENTS

| | | |
|---|---|---|
| JP | 10287941 A | 10/1998 |
| JP | 2011214629 A | 10/2011 |
| JP | 2014122313 A | 7/2014 |
| JP | 2015218808 A | 12/2015 |
| JP | 2017198226 A | 11/2017 |
| WO | 2017069140 A1 | 4/2017 |
| WO | 2017159465 A1 | 9/2017 |

OTHER PUBLICATIONS

ISR issued in Int'l. Application No. PCT/JP2018/046112, dated Jan. 15, 2019.

* cited by examiner

BRAKE LINING FOR RAILWAY VEHICLE, DISC BRAKE SYSTEM FOR RAILWAY VEHICLE INCLUDING SAME, AND SINTERED FRICTION MATERIAL TO BE USED FOR BRAKE LINING FOR RAILWAY VEHICLE

This is a National Phase Application filed under 35 U.S.C. § 371, of International Application No. PCT/JP2018/046112 filed Dec. 14, 2018, the contents of which are incorporated by reference.

TECHNICAL FIELD

The present disclosure relates to a brake lining for a railway vehicle, a disc brake system for the railway vehicle including the brake lining for the railway vehicle, and a sintered friction material to be used for the brake lining for the railway vehicle.

BACKGROUND ART

Railway vehicles, typically Shinkansen, have been increasingly high-speed and large-sized. As one of the braking devices for these railway vehicles, a disc brake system is adopted.

Disc brake systems for a railway vehicle are categorized as mechanical brake devices of an adhesion system. A disc brake system for the railway vehicle includes brake discs and a brake caliper. The brake discs are attached to a wheel or an axle of the railway vehicle. The brake caliper is attached to a bogie, which is a running gear. The brake caliper includes brake linings, caliper arms to which the brake linings are attached, and a pneumatic or hydraulic pressing mechanism that moves the caliper arms to press the brake linings against the brake discs. In braking, the pressing mechanism presses the brake linings against sliding surfaces of the brake discs. At that time, the disc brake system for the railway vehicle applies brakes to rotation of the wheel or the axle using a frictional force generated between the brake discs and the brake linings, so as to decelerate or stop the railway vehicle.

The brake linings each include a base plate attachable to the caliper arm of the brake caliper, a friction material, and a friction material supporting mechanism. The friction material supporting mechanism is disposed between the base plate and the friction material and supports the friction material. The friction material supporting mechanism may include, for example, an elastic member that is typically a belleville washer. The friction material supporting mechanism included in the brake lining supports the friction material movably in a thickness direction of the base plate. Therefore, the friction material can be moved in the thickness direction of the base plate in braking in accordance with unevenness of the brake disc, so as to increase a contact area of the friction material with respect to the brake disc. This makes it easy to equalize a contact pressure distribution of the friction material in braking. As a result, a temperature distribution of the brake disc can be equalized, and in addition, uneven wear of the friction material can be reduced.

Here, a brake lining including a friction material supporting mechanism tends to make noises called "brake squeal" in braking. It is considered that the brake squeal is caused by self-induced vibration that is created over the entire disc brake system for a railway vehicle due to a frictional force generated between a brake disc and the brake lining. The self-induced vibration is a phenomenon that occurs in a system in such a way that extrinsic steady (aperiodic) energy is converted in the system into exciting energy to vibrate itself, which increases an amplitude of the vibration.

Techniques for reducing brake squeal of a brake lining including a friction material supporting mechanism are proposed in Japanese Patent Application Publication No. 2011-214629 (Patent Literature 1), Japanese Patent Application Publication No. 2015-218808 (Patent Literature 2), and Japanese Patent Application Publication No. 2014-122313 (Patent Literature 3).

In the technique of the Patent Literature 1, a stiffness of the friction member supporting mechanism is defined as a "supporting stiffness," and by controlling the support stiffness, the brake squeal is reduced. Specifically, the brake lining for a railway vehicle disclosed in Patent Literature 1 includes friction members and a base plate for supporting the friction members. In a state where the brake lining is disposed on a bogie, a support stiffness of friction members present in a vertical-direction center line H portion of the brake lining is set to be lower than that of friction members present in portions other than the centerline H portion.

In the technique of Patent Literature 2, the brake squeal is reduced by imparting a damping capability to a friction material. Specifically, a friction material for lining disclosed in Patent Literature 2 contains polytetrafluoroethylene and acrylic-rubber-modified phenolic resin.

In the technique of Patent Literature 3, the brake squeal is reduced by stabilizing a coefficient of friction of a friction material. Specifically, the friction material disclosed in Patent Literature 3 contains a fiber preform, a friction adjustment material, a binding material, and in addition, two or more kinds of non-whisker-shaped titanate compounds. The two or more kinds of non-whisker-shaped titanate compounds contain at least non-whisker-shaped lithium potassium titanate but no copper component.

CITATION LIST

Patent Literature

Patent Literature 1: Japanese Patent Application Publication No. 2011-214629
Patent Literature 2: Japanese Patent Application Publication No. 2015-218808
Patent Literature 3: Japanese Patent Application Publication No. 2014-122313

Non Patent Literature

Non-Patent Literature 1: Transactions of the Japan Society of Mechanical Engineers Series A, Vol. 71, Issue 709, No. 03-1224

SUMMARY OF INVENTION

Technical Problem

A described above, according to Patent Literature 1, the brake squeal is reduced by controlling the stiffness of the friction member supporting mechanism (support stiffness). According to Patent Literature 2, the brake squeal is reduced by imparting a damping function to a friction material. According to Patent Literature 3, the brake squeal is reduced by stabilizing a coefficient of friction of a friction material. However, how to reduce the brake squeal in a disc brake system for a railway vehicle is not limited to the methods described above, and may be provided by another method.

An objective of the present disclosure is to provide a brake lining for a railway vehicle capable of reducing brake squeal in braking a railway vehicle, a disc brake system for the railway vehicle including the brake lining for the railway vehicle, and a sintered friction material to be used for brake lining for the railway vehicle.

Solution to Problem

A brake lining for a railway vehicle according to the present disclosure is a brake lining for the railway vehicle to be used for a disc brake system for the railway vehicle, the brake lining including:
a base plate;
a sintered friction material into which a plurality of powder particles are sintered; and
a friction material supporting mechanism that is disposed between the base plate and the sintered friction material and supports the sintered friction material, wherein
a Young's modulus of the sintered friction material is 35.0 GPa or more.

A disc brake system for a railway vehicle according to the present disclosure, includes:
a brake disc that is attached to a wheel or an axle of the railway vehicle; and
a brake caliper that is attached to a bogie of the railway vehicle, wherein
the brake caliper includes:
a brake lining for the railway vehicle described above;
a caliper arm to which the brake lining for the railway vehicle is attached; and
a pressing mechanism that is capable of pressing the brake lining for the railway vehicle against the brake disc.

The sintered friction material according to the present disclosure is used for a brake lining for the railway vehicle.

Advantageous Effects of Invention

A brake lining for a railway vehicle, a disc brake system for the railway vehicle including the brake lining for the railway vehicle, and a sintered friction material to be used for the brake lining for the railway vehicle according to the present disclosure can reduce brake squeal in braking the railway vehicle.

DESCRIPTION OF EMBODIMENTS

Figure 1:
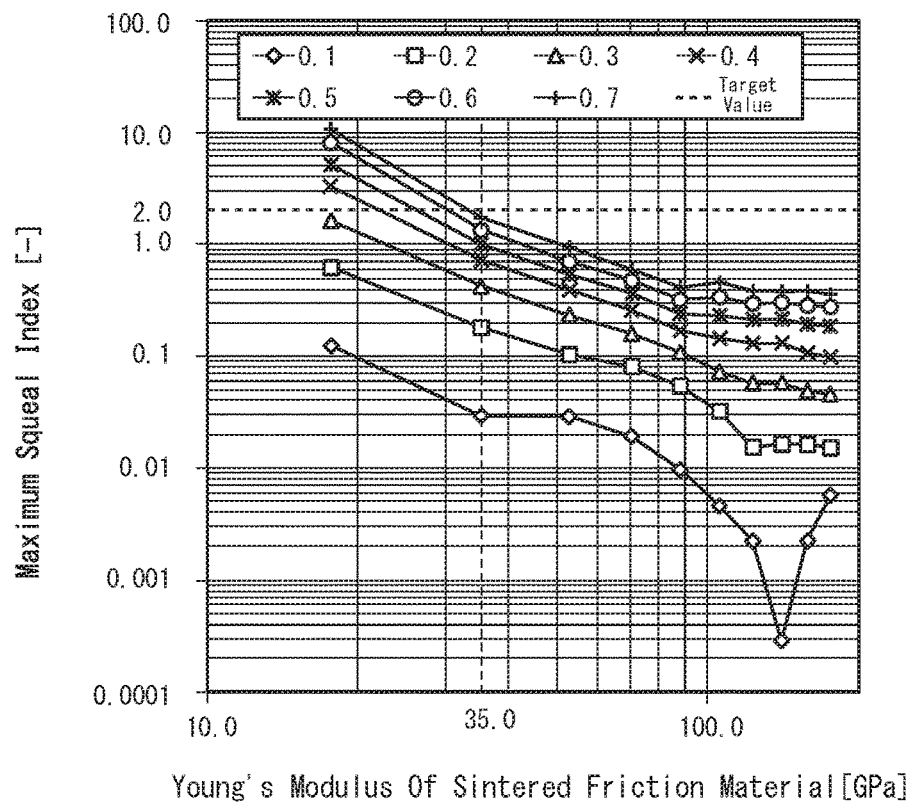
FIG. 1 is a graph illustrating relationships between the Young's moduli of sintered friction materials and maximum squeal indexes, which are obtained from analysis results of brake squeal using an opposed-type disc brake system.

The present inventors first investigated and studied a cause of brake squeal in a disc brake system for a railway vehicle including a brake lining for the railway vehicle that includes a friction material supporting mechanism.

The disc brake systems for railway vehicles are broadly classified into two types: a floating type and an opposed type. A floating-type disc brake system for a railway vehicle includes a brake caliper that includes a pair of caliper arms for supporting a pair of brake linings, and one of the caliper arms is provided with a pressing mechanism for pressing the brake linings against a brake disc. In a case of the floating type, the pressing mechanism pushes one of the brake linings attached to one of the pair of caliper arms toward the brake disc, and then the brake lining is pressed against the brake disc. At that time, a pressing force exerted from the brake lining on the brake disc causes a reaction force, which causes the brake caliper to slide in an opposite direction to a pressing direction of one of the brake linings produced by the pressing mechanism. As a result, the pair of brake linings sandwich the brake disc attached to a wheel or an axle to perform a braking action. The pressing mechanism includes, for example, a well-known piston and/or diaphragm. An opposed-type disc brake system for the railway vehicle includes a brake caliper that includes a pair of caliper arms for supporting a pair of brake linings, and each of the caliper arms is provided with a pressing mechanism. The floating type and opposed type both can be used for a disc brake system for railway vehicles. It is therefore preferable that the brake squeal is reduced both in the floating type and the opposed type.

Of components of a disc brake system for a railway vehicle, the present inventors paid attention to a sintered friction material, which is a component applied both to the floating type and the opposed type. Hence, the present inventors considered that the brake squeal can be reduced even in a case of a disc brake system for the railway vehicle including a brake caliper of either type if the brake squeal can be reduced by adjusting mechanical properties of the sintered friction material.

Here, a high-speed railway vehicle for which a disc brake system for a railway vehicle is used can travel at a high-speed range of 260 km/h or more. In a case of braking the railway vehicle traveling at such a high-speed range with the disc brake system, a coefficient of friction between a brake disc and a sintered friction material of a brake lining changes depending on a speed of the railway vehicle at a start of the braking. In a case of the high-speed railway vehicle that can travel at the high-speed range of 260 km/h or more, the coefficient of friction between the brake disc and the sintered friction material of the brake lining widely ranges from 0.2 to 0.6 depending on a traveling speed. Therefore, for a brake lining of a disc brake system to be applied to a railway vehicle, it is therefore desirable that the brake squeal can be reduced at a coefficient of friction ranging from 0.2 to 0.6.

The present inventors first investigated and studied relationships between brake squeal and mechanical properties with coefficients of friction ranging from 0.2 to 0.6, on sintered friction materials used in a brake lining of a disc brake system for a railway vehicle that can travel at the high-speed range of 260 km/h or more. As a result, it was found that, of various mechanical properties of the sintered friction materials, the Young's modulus correlates negatively with the brake squeal. Hence, the present inventors further investigated in detail the relationship between the Young's modulus and the brake squeal, and it was consequently found for the first time that brake squeal of a sintered friction material can be reduced sufficiently with a coefficient of friction ranging from 0.2 to 0.6 by setting the Young's modulus at 35.0 GPa or more. This regard will be described below in detail.

Figure 2:
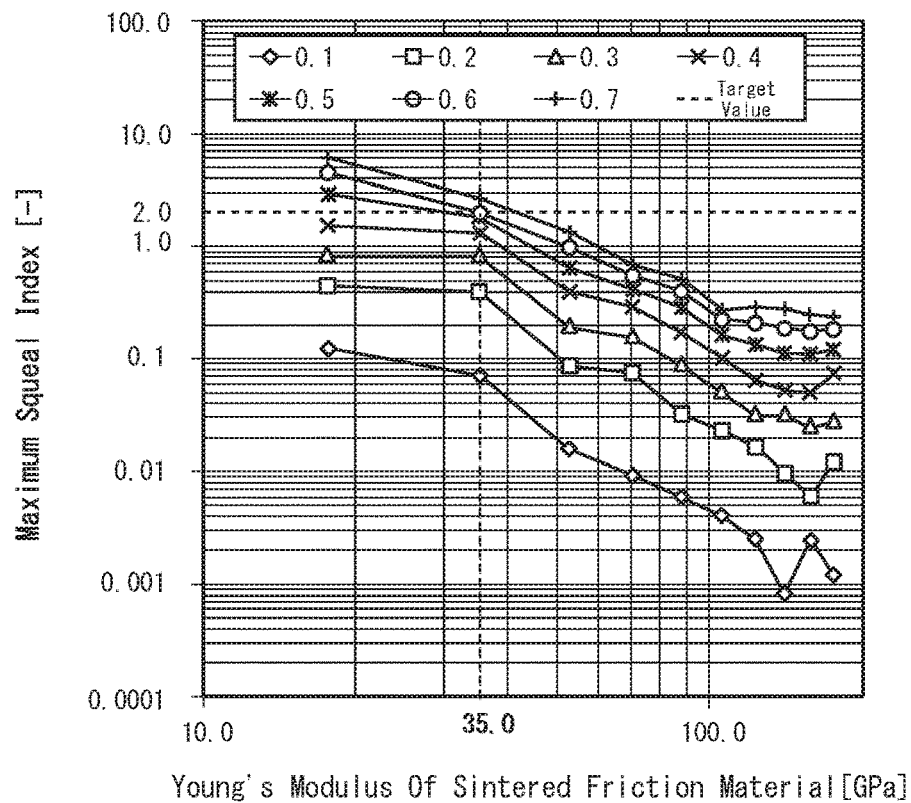
FIG. 2 is a graph illustrating relationships between the Young's moduli of sintered friction materials and maximum squeal indexes, which are obtained from analysis results of brake squeal using a floating-type disc brake system.

FIG. 1 is a graph illustrating a relationship between the Young's modulus of sintered friction material (GPa) and maximum squeal index, which is obtained from an analysis of brake squeal using an opposed-type disc brake system. FIG. 2 is a graph illustrating a relationship between the Young's modulus of sintered friction material (GPa) and maximum squeal index, which is obtained from an analysis of brake squeal using a floating-type disc brake system. FIG. 1 and FIG. 2 are obtained from the complex eigenvalue analysis using the finite element method (FEM). Here, the maximum squeal index is defined in the following manner. In the complex eigenvalue analysis using the finite element method (FEM), the complex eigenvalue analysis is conducted with various Young's moduli of a sintered friction material, and then natural frequencies and damping ratios are obtained. If a negative damping ratio of a vibration is obtained, a mode of the vibration is determined to be an unstable mode. In the unstable mode, a sum of absolute values of the damping ratios at ⅓ octave band frequencies is defined as a "squeal index". Of calculated squeal indexes, a maximum squeal index is defined as a "maximum squeal index."

After repeatedly performing the complex eigenvalue analyses using the FEM and experiments, the present inventors determined that the brake squeal can be reduced sufficiently, by decreasing the maximum squeal index to a target value (2.0) or less.

Numerical values following marks shown in upper portions of FIG. 1 and FIG. 2 are coefficients of friction of the corresponding marks. Referring to FIG. 1 and FIG. 2, in both types (FIG. 1: opposed type, FIG. 2: floating type), in cases where the Young's moduli of sintered friction materials are 35.0 GPa or more with the coefficients of friction ranging from 0.2 to 0.6, the maximum squeal indexes become 2.0 or less, which means that the brake squeal could be reduced sufficiently. Therefore, if the Young's modulus of a sintered friction material is 35.0 GPa or more, the brake squeal can be reduced sufficiently during braking a railway vehicle in a brake lining for a railway vehicle including a friction material supporting mechanism.

With the coefficients of friction ranging from 0.2 to 0.6, the maximum squeal indexes monotonously decrease with increase in the Young's moduli of sintered friction materials until the Young's moduli of sintered friction materials reach 100.0 GPa. In contrast, in cases where the Young's moduli are more than 100.0 GPa, the maximum squeal indexes do not decrease significantly even when the Young's moduli further increase; in particular, at high coefficients of friction (the coefficients of friction being 0.5, 0.6, etc.), the maximum squeal indexes become substantially constant. In other words, in a relationship between the Young's moduli of sintered friction materials and the maximum squeal indexes, there is an inflection point in a vicinity of Young's modulus=100.0 GPa. Therefore, an upper limit of the Young's moduli of the sintered friction materials is preferably 100.0 GPa in a case where contents of Cu of the sintered friction materials are 40.0% or more.

A mechanism of reducing the brake squeal by increasing a Young's modulus of a sintered friction material is considered as follows.

In a state where a brake disc and a sintered friction material are in contact with each other, it is considered that self-induced vibration generated in braking a railway vehicle is caused by a combination of vibration in a pressing direction of the sintered friction material and vibration in a sliding direction of the brake disc and the sintered friction material. In a case where the Young's modulus of the sintered friction material is increased, the vibration in the pressing direction and the vibration in the sliding direction become difficult to combine, which makes it difficult for the self-induced vibration to occur.

Based on result of the investigations described above, the present inventors have completed the present invention based on a technical concept of reducing, in a brake lining for a railway vehicle, the brake squeal in braking the railway vehicle by bringing a Young's modulus of sintered friction materials to 35.0 GPa or more, which is different from conventional technical concepts.

A brake lining for a railway vehicle according to the present embodiment completed based on the above findings has a configuration described below.

A brake lining for a railway vehicle of [1] is a brake lining for the railway vehicle to be used for a disc brake system for the railway vehicle, the brake lining including:
a base plate;
a sintered friction material into which a plurality of powder particles are sintered; and
a friction material supporting mechanism that is disposed between the base plate and the sintered friction material and supports the sintered friction material, wherein
a Young's modulus of the sintered friction material is 35.0 GPa or more.

The brake lining for the railway vehicle of [1] may be used for either a floating-type disc brake system for the railway vehicle or an opposed-type disc brake system for the railway vehicle. In the brake lining for a railway vehicle in the present embodiment, the sintered friction material has a Young's modulus of 35.0 GPa or more. Therefore, the brake squeal can be reduced with coefficients of friction widely ranging from 0.2 to 0.6 even in a case where the brake lining for the railway vehicle in the present embodiment is applied to a railway vehicle that is designed to travel at a traveling speed within a high-speed range of 260 kin/h or more.

A brake lining for a railway vehicle of [2] is the brake lining for the railway vehicle according to [1], wherein
the sintered friction material contains, in mass percent, 40.00% or more of Cu, and
a porosity of the sintered friction material is 12.0% or less.

A brake lining for a railway vehicle of [3] is the brake lining for the railway vehicle according to [1] or [2], wherein
a Young's modulus of the sintered friction material is 100.0 GPa or less.

A brake lining for a railway vehicle of [4] is the brake lining for the railway vehicle according to any one of [1] to [3], wherein the friction material supporting mechanism includes
an elastic member that is disposed between the base plate and the sintered friction material.

Here, examples of the elastic member include a spring, a resin, and the like. Examples of the spring include a belleville washer, a leaf spring, a wire spring, and the like. Examples of the resin include a natural nibber, a synthetic rubber, and the like.

A disc brake system for the railway vehicle of [5] includes:

a brake disc that is attached to a wheel or an axle of the railway vehicle; and a brake caliper that is attached to a bogie of the railway vehicle, wherein the brake caliper includes:

the brake lining for the railway vehicle according to any one of the above [1] to [4];

a caliper arm to which the brake lining for the railway vehicle is attached; and a pressing mechanism that is capable of pressing the brake lining for the railway vehicle against the brake disc.

The disc brake system for a railway vehicle in the present embodiment may be any one of a floating-type disc brake system for the railway vehicle and an opposed-type disc brake system for the railway vehicle. Each of the floating-type and the opposed-type disc brake systems for the railway vehicle includes the brake discs and the brake caliper described above. In the disc brake system for the railway vehicle in the present embodiment, the sintered friction material has a Young's modulus of 35.0 GPa or more. Therefore, the brake squeal can be reduced with coefficients of friction widely ranging from 0.2 to 0.6 even in a case where the brake lining for the railway vehicle in the present embodiment is applied to a railway vehicle that is designed to travel at a traveling speed within a high-speed range of 260 km/h or more.

A sintered friction material of [6] is used for the brake lining for the railway vehicle according to any one of the above [1] to [4].

The brake lining for the railway vehicle according to the present embodiment, a disc brake system for the railway vehicle including the brake lining for the railway vehicle, and a sintered friction material to be used for brake lining for the railway vehicle will be described below.

[Configurations of Disc Brake System for the Railway Vehicle and Brake Lining for the Railway Vehicle]

[Disc Brake System for the Railway Vehicle]

Figure 3:
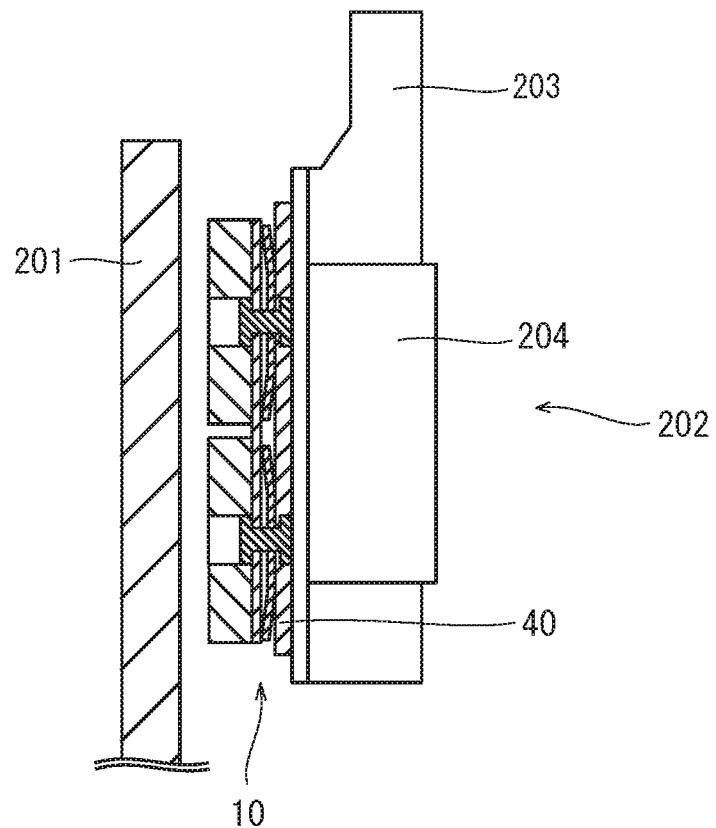
FIG. 3 is a schematic diagram of a disc brake system for a railway vehicle according to the present embodiment.

FIG. 3 is a schematic diagram of a disc brake system for a railway vehicle according to the present embodiment. Referring to FIG. 3, a disc brake system of the railway vehicle is a disc brake device and includes a brake disc 201 and a brake caliper 202. The brake disc 201 is attached to a wheel or an axle of the railway vehicle (described below). The brake caliper 202 is attached to a bogie (described below), which is a running gear. The brake caliper 202 includes a brake lining 10, a caliper arm 203 to which the brake lining 10 is attached, and a pressing mechanism 204. In braking, the pressing mechanism 204 presses the brake lining 10 against the brake disc 201. The pressing mechanism 204 is, for example, a piston and/or a diaphragm. The pressing mechanism 204 may be pneumatic or hydraulic. The pressing mechanism 204 presses the brake lining 10 against the brake disc 201 to produce a frictional force between the brake lining 10 and the brake disc 201, reducing rotation of the wheel or the axle, so as to brake the railway vehicle. The disc brake system for the railway vehicle in the present embodiment may be of the opposed type or of the floating type.

Figure 4A:
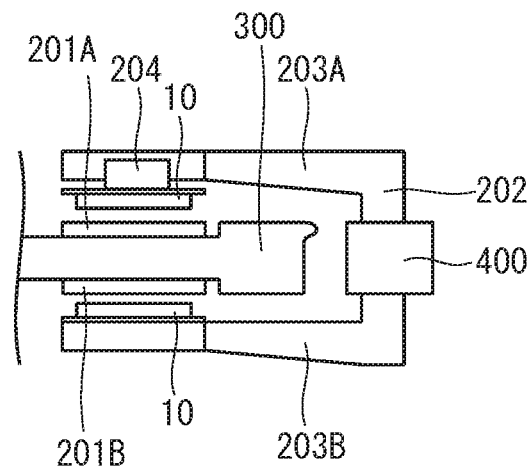
FIG. 4A is a schematic diagram of a floating-type disc brake system for a railway vehicle.

FIG. 4A is a schematic diagram of a floating-type disc brake system for a railway vehicle. Referring to FIG. 4A, the floating-type disc brake system for the railway vehicle includes, as in FIG. 3, a brake disc 201 (201A and 201B) and a brake caliper 202. In FIG. 4A, a wheel 300 is disposed between the brake discs 201A and 201B paired together. The brake discs 201A and 201B are fixed to the wheel 300. The brake caliper 202 is attached to a bogie 400, which is a running gear. Specifically, the brake caliper 202 of the floating-type disc brake system for the railway vehicle is attached to the bogie 400 in such a manner that the brake caliper 202 is slidable in a thickness direction of the wheel 300 (direction perpendicular to a radial direction of the wheel 300).

The brake caliper 202 includes a pair of caliper arms 203A and 203B, a pressing mechanism 204, and a pair of brake linings 10. The caliper arms 203A and 203B each include the brake lining 10. The brake lining 10 attached to the caliper arm 203A is disposed facing the brake disc 201A attached to the wheel 300. The brake lining 10 attached to the caliper arm 203B is disposed facing the brake disc 201B attached to the wheel. The pressing mechanism 204 is attached to the caliper arm 203A and capable of pressing the brake lining 10 of the caliper arm 203A against the brake disc 201A.

Figure 4B:
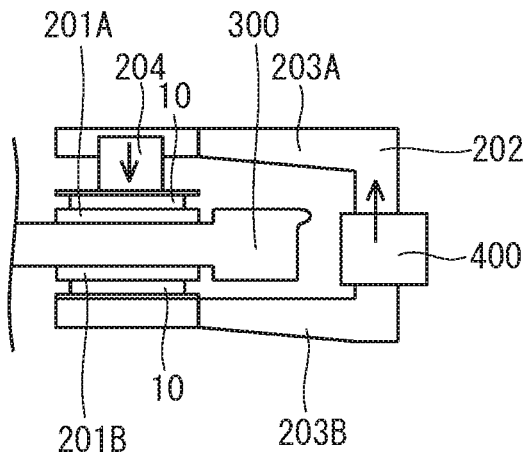
FIG. 4B is a schematic diagram used for describing a braking action of the floating-type disc brake system for a railway vehicle.

A braking action of the floating-type disc brake system for a railway vehicle is illustrated in FIG. 4B. The pressing mechanism 204 pushes the brake lining 10 of the caliper arm 203A to press the brake lining 10 against the brake disc 201A of the wheel 300. At that time, a pressing force exerted from the brake lining 10 on the brake disc 201A causes a reaction force, which causes the brake caliper 202 including the pair of caliper arms 203A and 203B to slide in an opposite direction to a pressing direction of the brake lining 10 produced by the pressing mechanism 204. As a result, the pair of brake linings 10 sandwiches the brake discs 201A and 201B as well as the wheel 300, braking the wheel 300.

Figure 5:
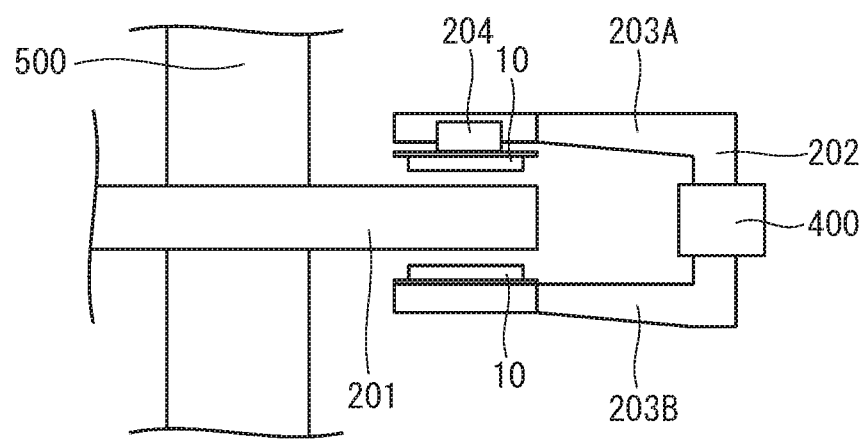
FIG. 5 is a schematic diagram of a disc brake system for a railway vehicle that is different from the disc brake system for the railway vehicle illustrated in FIG. 4A and FIG. 4B.

In FIG. 4A and FIG. 4B, the pressing mechanism 204 is attached to the caliper arm 203A but not to the caliper arm 203B. However, the pressing mechanism 204 may be attached to the caliper arm 203B but not to the caliper arm 203A. In addition, FIG. 4A and FIG. 4B illustrate the floating-type disc brake system for a railway vehicle in which the brake disc 201 (201A and 201B) is attached to the wheel 300. However, in a floating-type disc brake system for the railway vehicle, a brake disc 201 may be attached to an axle 500, as illustrated in FIG. 5. In this case, the brake disc 201 is attached coaxially with the axle 500.

Figure 6:
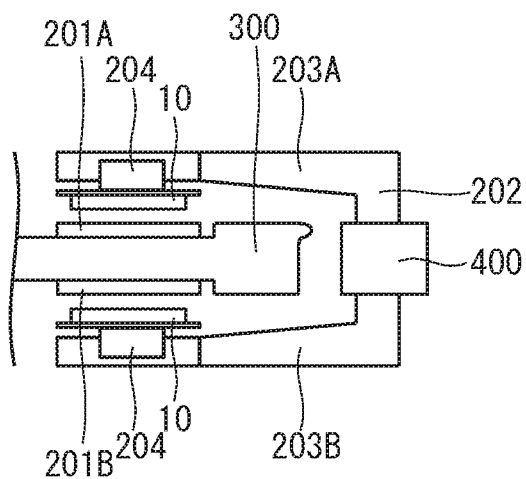
FIG. 6 is a schematic diagram of an opposed-type disc brake system for a railway vehicle.

FIG. 6 is a schematic diagram of an opposed-type disc brake system for a railway vehicle. Referring to FIG. 6, the opposed-type disc brake system for the railway vehicle includes, as in FIG. 3, a brake disc 201 (201A and 201B) and a brake caliper 202. In FIG. 6, a wheel 300 is disposed between the brake discs 201A and 201B paired together. The brake caliper 202 is attached to a bogie 400, which is a running gear. Specifically, the brake caliper 202 of the opposed-type disc brake system for the railway vehicle is fixed to the bogie 400.

The brake caliper 202 includes a pair of caliper arms 203A and 203B, a pair of pressing mechanisms 204, and a pair of brake linings 10. The caliper arms 203A and 203B each include the brake lining 10. The brake lining 10 attached to the caliper arm 203A is disposed facing the brake disc 201A attached to the wheel 300. The brake lining 10 attached to the caliper arm 203B is disposed facing the brake disc 201B attached to the wheel 300.

Additionally, in the opposed-type disc brake system for a railway vehicle, the pressing mechanisms 204 are attached to the caliper aims 203A and 203B, respectively. The pressing mechanism 204 attached to the caliper arm 203A is capable of pressing the brake lining 10 of the caliper arm 203A against the brake disc 201A. The pressing mechanism 204 attached to the caliper arm 203B is capable of pressing the brake lining 10 of the caliper arm 203B against the brake disc 201B. In the opposed-type disc brake system for the railway vehicle, the pressing mechanisms 204 attached to the caliper arms 203A and 203B press the corresponding brake linings 10 against the brake disc 201 (201A or 201B), respectively, to brake the wheel 300.

In summary, while the floating-type disc brake system for a railway vehicle uses one pressing mechanism 204 to perform the braking action, the opposed-type disc brake system for the railway vehicle uses two pressing mechanisms 204 to perform the braking action. FIG. 6 illustrates the opposed-type disc brake system for the railway vehicle in which the brake disc 201 (201A and 201B) is attached to the wheel 300. However, in an opposed-type disc brake system for the railway vehicle, a brake disc 201 may be attached to an axle in place of a wheel 300. In this case, the brake disc 201 is attached coaxially with the axle.

[Configuration of Brake Lining 10]

Figure 7:
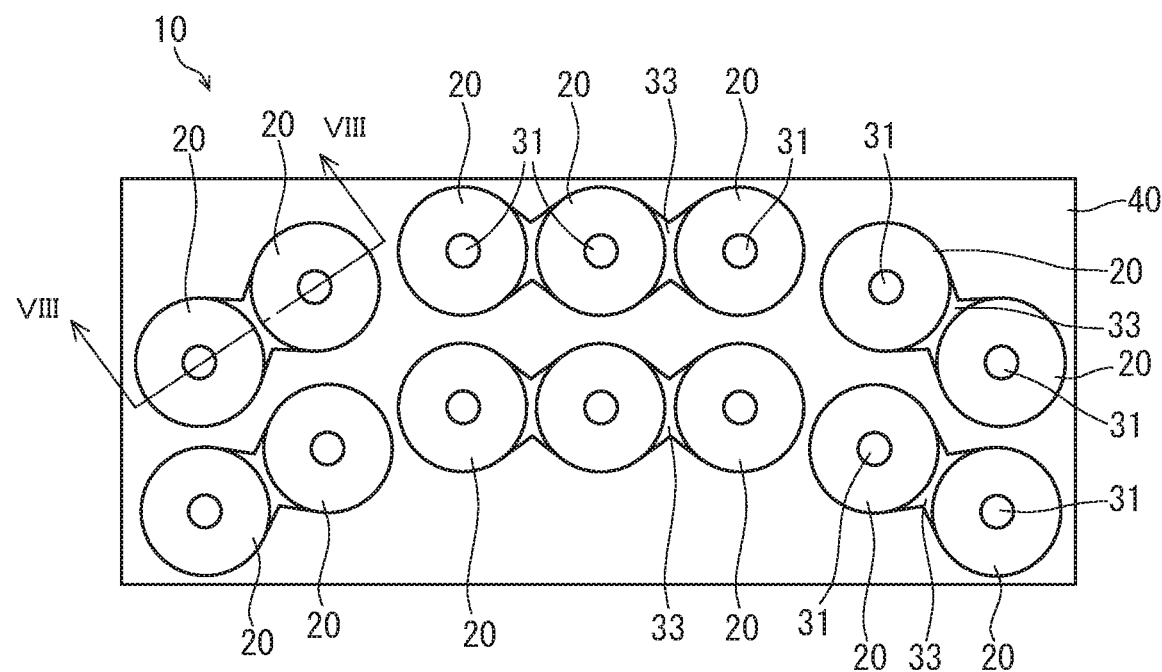
FIG. 7 is a front view of a brake lining for a railway vehicle as viewed from a brake disc side.
Figure 8:
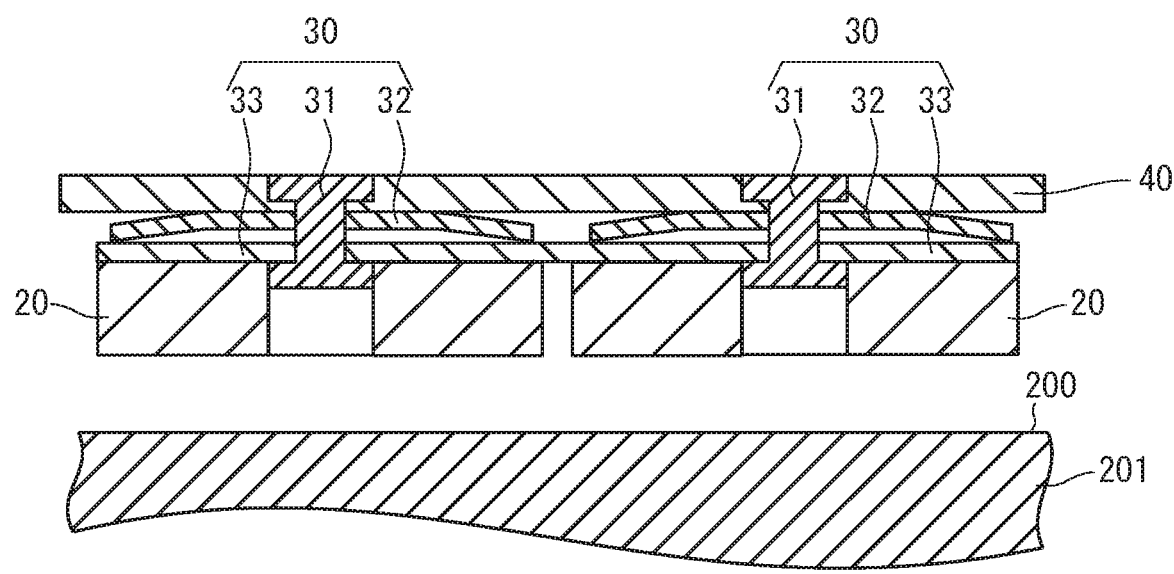
FIG. 8 is a cross sectional view taken along a line segment VIII-VIII in FIG. 7.

FIG. 7 is a front view of the brake lining 10 that faces a surface of the brake disc 201 in the disc brake systems for the railway vehicle illustrated in FIG. 3 to FIG. 6. FIG. 8 is a cross sectional view taken along a line segment VIII-VIII in FIG. 7.

Referring to FIG. 7 and FIG. 8, the brake lining 10 includes a plurality of sintered friction materials 20, friction material supporting mechanisms 30, and a base plate 40.

The base plate 40 is attached to the caliper arm 203 of the brake caliper 202 (see FIG. 3). The friction material supporting mechanisms 30 are disposed between the sintered friction materials 20 and the base plate 40, and are attached to the base plate 40. Additionally, the friction material supporting mechanisms 30 supports the sintered friction materials 20. The friction material supporting mechanisms 30 are coupled to the base plate 40 and the sintered friction materials. The friction material supporting mechanisms preferably support the sintered friction materials 20 in such a manner that the sintered friction materials 20 can move at least in a thickness direction of the base plate 40. Here, the thickness direction of the base plate 40 means a direction perpendicular to a main surface of the base plate 40 (a surface having a largest area of surfaces of the base plate 40).

No particular limitation is imposed on a configuration of the friction material supporting mechanisms 30. The friction material supporting mechanisms 30 each include, for example, an attachment member 31, an elastic member 32, and a back plate 33. Of surfaces of each sintered friction material 20, a surface on an opposite side to a surface facing a sliding surface 200 of the brake disc 201 (a back surface) is fixed to the back plate 33. The attachment members 31 attach the back plates 33 to the base plate 40 in such a manner that the back plates 33 can move in the thickness direction of the base plate 40. The attachment members 31 are, for example, but not limited to, rivets. The attachment members 31 may be each formed of a bolt and a nut, and may be configured differently.

The elastic members 32 disposed between the sintered friction materials 20 and the base plate 40. In FIG. 8, the elastic members 32 are disposed between the back plates 33 and the base plate 40. The elastic members 32 may be, for example, springs typified by belleville washers or may be a resin such as a rubber.

With elastic members 32, the friction material supporting mechanisms 30 support the sintered friction materials 20 in such a manner that the sintered friction materials 20 can move at least in the thickness direction of the base plate 40. This makes it easy for the sintered friction materials 20 to come into contact with the sliding surface 200 of the brake disc 201 uniformly, making a temperature distribution of the brake disc 201 uniform, which in turn reduces uneven wear of the sintered friction materials 20.

The friction material supporting mechanisms 30 need not include the elastic members 32. No limitations are imposed on the configuration and the mechanism of the friction material supporting mechanisms 30 as long as the friction material supporting mechanisms 30 support the sintered friction materials 20 in such a manner that the sintered friction materials 20 can move at least in the thickness direction of the base plate 40.

In FIG. 7 and FIG. 8, a plurality of sintered friction material units, in each of which a plurality of sintered friction materials 20 are fixed to one back plate 33, are disposed on the base plate 40. A brake lining 10 including the plurality of sintered friction material units is referred to an isobaric-structure brake lining 10. The isobaric-structure brake lining 10 brings the sintered friction material units into uniform contact with the brake disc 201, so as to equalize surface pressures in contact between the brake lining 10 and the brake disc 201. However, the brake lining 10 in the present embodiment is not limited to the isobaric structure.

Figure 9:
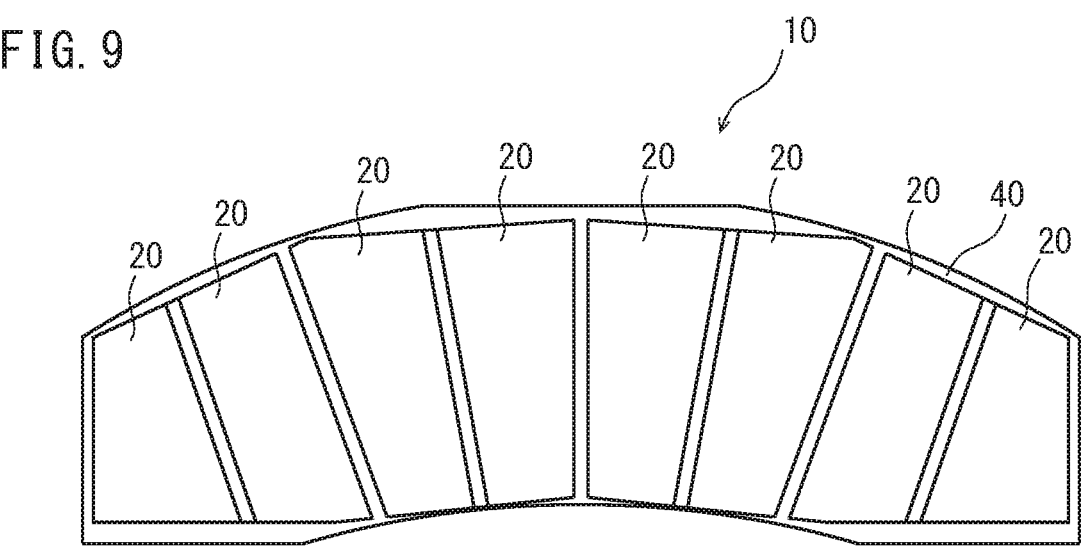
FIG. 9 is a front view of a brake lining for a railway vehicle that is different from the brake lining for the railway vehicle illustrated in FIG. 7.

In FIG. 7, the sintered friction materials 20 each have a disc shape, but no particular limitation is imposed on a shape of the sintered friction materials 20. As illustrated in FIG. 9, the sintered friction materials 20 may be rectangular plate materials or may have another kind of shape such as a polygon.

As described above, in FIG. 7 and FIG. 9, the brake lining 10 includes the plurality of sintered friction materials 20, but the brake lining 10 may include one sintered friction material 20 or a plurality of sintered friction materials 20. The brake lining 10 should include at least one sintered friction material 20.

As described above, in the present embodiment, the sintered friction material 20 has a Young's modulus of 35.0 GPa or more. As shown in the graphs illustrated in FIG. 1 (opposed-type) and FIG. 2 (floating-type), in both types, in a case where Young's moduli of the sintered friction material 20 is 35.0 GPa or more with coefficients of friction ranging from 0.2 to 0.6 in braking, maximum squeal index becomes 2.0 or less, which means that the brake squeal can be reduced sufficiently. Therefore, the Young's moduli of the sintered friction material 20 is 35.0 GPa or more. Although no particular limitation is imposed on an upper limit of the Young's modulus of the sintered friction material 20, note that the effect of reducing the brake squeal levels off if the Young's moduli of the sintered friction material 20 is more than 100.0 GPa, as illustrated in FIG. 1 and FIG. 2. Therefore, the upper limit of the Young's moduli of the sintered friction material 20 is preferably 100.0 GPa. The Young's moduli of the sintered friction materials can be measured by the testing method for dynamic elastic modulus (bending resonance method) conforming to JIS R 1602 (1995).

[Chemical Composition Example of Sintered Friction Material]

As long as the sintered friction material has a Young's modulus of 35.0 GPa or more, no particular limitation is imposed on a chemical composition of the sintered friction material. The sintered friction material is preferably a sintered material containing a Cu-based alloy. The sintered friction material is formed by sintering a plurality of powder particles. Although no particular limitation is imposed on a particle diameter of each powder particle, the particle diameter ranges, for example, from 1 to 1000 μm. An example of the chemical composition of the sintered friction material will be described below, but this does not limit the chemical composition of the sintered friction material, as described above. Note that the sign "%" relating to the composition of the sintered friction material means mass percent.

[Raw Material of Sintered Friction Material]

Raw material powder being a raw material of the sintered friction material is constituted by a plurality of powder particles described above. Specifically, the raw material powder contains Cu and a dispersing agent.

A preferable content of Cu in the raw material powder is as follows.

Cu: 40.00% or More

Copper (Cu) functions as a matrix (base material) of the sintered friction material. Cu has a high thermal conductivity. This can suppress a temperature rise in an interface between an object to be braked (brake disc, etc.) and the sintered friction material in braking (with friction), preventing excessive seizure from occurring. This increases a wear resistance of the sintered friction material. In addition, Cu being the matrix retains the dispersing agent described below contained in the matrix (lubricant, hard particles). In a case where the content of Cu in the raw material powder is 40.00% or more, the effects described above are obtained more effectively. A lower limit of the content of Cu is preferably 45.00%, more preferably 50.00%, still more preferably 55.00%.

No particular limitation is imposed on an upper limit of the content of Cu. An upper limit of the Cu content is preferably 75.00%. If the content of Cu is 75.00% or less, friction due to adhesion to a sliding surface of the brake disc to be braked is reduced effectively, increasing the wear resistance of the sintered friction material effectively. Therefore, the content of Cu in the raw material powder preferably ranges from 40.00 to 75.00%.

The raw material powder may contain, in addition to the powder particle containing Cu, other kinds of metallic particles (Ni, Zn, Sn, Fe, etc.). These kinds of metallic particles are well-known raw materials of the sintered friction material.

[Dispersing Agent]

The raw material powder being a raw material of the sintered friction materials 20 may further contain at least one or more kinds of dispersing agents selected from the group consisting of the following (1) to (7). More specifically, the raw material of the sintered friction material 20 may contain 40.00% or more of Cu in mass percent, and the one or more kinds of dispersing agents selected from the group consisting of the following (1) to (7). Note that the raw material powder need not contain the one or more kinds of dispersing agents.

(1) Graphite (2) One or more kinds selected from the group consisting of Magnesia, zircon sand, silica, zirconia, mullite, and silicon nitride (3) One or more kinds selected from the group consisting of W and Mo (4) One or more kinds selected from the group consisting of ferrochromium, ferrotungsten, ferromolybdenum, and stainless steel (5) One or more kinds selected from the group consisting of the following (a) to (d)

(a) Hexagonal boron nitride (b) Molybdenum disulfide (c) Mica (d) One or more kinds selected from iron sulfide, copper sulfide, and copper matte (6) Vanadium carbide (7) Fe The dispersing agents (1) to (7) will be described below.

(1) Graphite

As used herein, graphite may be either natural graphite or synthetic graphite. In a sintered friction material after pressure sintering, graphite is contained in the matrix in a form of particles. Graphite functions as a lubricant, stabilizing a coefficient of friction and reducing an amount of wear of the sintered friction material. In other words, graphite increases the wear resistance of the sintered friction material. A content of graphite in the raw material powder preferably ranges from 5.00 to 15.00%.

(2) One or more kinds selected from the group consisting of Magnesia, zircon sand, silica, zirconia, mullite, and silicon nitride Magnesia (MgO), zircon sand ($ZrSiO_4$), silica ($SiO_2$), zirconia ($ZrO_2$), mullite ($3Al_2O_3 \cdot 2SiO_2$-$2Al_2O_3 SiO_2$), and silicon nitride ($Si_3N_4$) are all ceramics, which function as hard particles. In a sintered friction material after pressure sintering, these ceramics are contained in the matrix in a form of particles. These ceramics all scratch a sliding surface of the object to be braked (brake disc, etc.) to remove an oxide film formed on the sliding surface, stably giving rise to adhesion. This can prevent decrease in the coefficient of friction with the object to be braked (brake disc, etc.) of the sintered friction material, providing an excellent friction property. In the raw material powder, a total content of the one or more kinds selected from the group of these ceramics preferably ranges from 1.50 to 15.00%.

(3) One or more kinds selected from the group consisting of W and Mo

Tungsten (W) and molybdenum (Mo) both function as hard particles. W and Mo are not dissolved in Cu being the matrix but are contained in the matrix in a form of particles. W and Mo both increase the wear resistance of the sintered friction material. In a case where W and/or Mo are contained together with Fe-based alloy particles described below, the wear resistance of the sintered friction material is further increased. A total content of the one or more kinds selected from the group consisting of W and Mo preferably ranges from 3.0 to 30.0%.

(4) One or more kinds selected from the group consisting of ferrochromium, ferrotungsten, ferromolybdenum, and stainless steel Ferrochromium (FeCr), ferrotungsten (FeW), ferromolybdenum (FeMo), and stainless steel are all not dissolved in the matrix but are contained in the matrix in a form of particles. Ferrochromium, ferrotungsten, ferromolybdenum, and stainless steel are herein collectively referred to as Fe-based alloy particles. These Fe-based alloy particles all increase the wear resistance of the sintered friction material. The reason for this is unclear, but the following reason is conceivable.

Hardness of the Fe-based alloy particles are higher than a hardness of the matrix (Cu). In addition, the Fe-based alloy particles have high affinities for the matrix as compared with the ceramics described above (magnesia, zircon sand, silica, zirconia, mullite, and silicon nitride), and resist being separated from the matrix. For that reason, the Fe-based alloy particles increase the wear resistance of the sintered friction material. A total content of the Fe-based alloy particles in the raw material powder preferably ranges from 2.0 to 20.0%.

Ferrochromium herein contains one or more kinds of high-carbon ferrochromiums (FCrH0 to FCrH5), medium-carbon ferrochromiums (FCrM3, FCrM4), and low-carbon ferrochromiums (FCrL1 to FCrL4) specified in JIS G 2303 (1998).

As used herein, ferrotungsten means a ferrotungsten (FW) that has a chemical composition specified in JIS G 2306 (1998).

Ferromolybdenum herein contains one or more kinds of a high-carbon ferromolybdenum (FMoH) and a low-carbon ferromolybdenum (FMoL) specified in JIS G 2307 (1998).

As used herein, the stainless steel means alloy steels that contain 50.0% or more of Fe and 10.5% or more of Cr in mass percent, more preferably means stainless steels specified in JIS G 4304 (2012). Examples of the stainless steel herein may include martensite stainless steels, typically SUS403 and SUS420, or ferritic stainless steels, typically SUS430, specified in JIS Standard described above. The stainless steel may be an austenitic stainless steel, typically SUS304, SUS316, and SUS316L. The stainless steel may be an austenitic-ferritic stainless steel, typically SUS329J1. The stainless steel may be a precipitation hardening stainless steel, typically SUS630.

(5) One or more kinds selected from the group consisting of the following (a) to (d)
 (a) Hexagonal boron nitride
 (b) Molybdenum disulfide
 (c) Mica
 (d) One or more kinds selected from iron sulfide, copper sulfide, and copper matte Hexagonal boron nitride (h-BN), molybdenum disulfide ($MoS_2$), mica, and one or more kinds selected from iron sulfide, copper sulfide and copper matte all function as lubricants. These lubricants stabilize the coefficient of friction of the sintered friction material and provide an excellent friction property, as with graphite.

Copper matte is described as No. 5400 in Glossary of terms used in wrought copper and copper-base alloy products in JIS H 0500 (1998) and mainly contain iron sulfide and copper sulfide. Iron sulfide and copper sulfide each act alone as a lubricant. Alternatively, iron sulfide and copper sulfide may be used as a mixture. The copper matte can be used as a mixture of iron sulfide and copper sulfide and has an advantage from an economical viewpoint because the copper matte is inexpensive. It is preferable that a content of hexagonal boron nitride is more than 0% and 3.0% or less in mass percent, a content of molybdenum disulfide is more than 0% and 3.0% or less in mass percent, a content of mica is more than 0% and 3.0% or less in mass percent, and a total content of the one or more kinds selected from iron sulfide, copper sulfide, and copper matte is more than 0% and 1.0% or less in mass percent.

(6) Vanadium carbide

Vanadium carbide (VC) is a hard particle and is contained in the matrix in a form of particles. Vanadium carbide has a synergetic effect with W on increasing the wear resistance of the sintered friction material. However, if a content of vanadium carbide is excessively high, a sinterability of the sintered friction material decreases, resulting in decrease in the wear resistance. The content of vanadium carbide is preferably more than 0% and 5.00% or less in mass percent.

(7) Fe

Iron (Fe) is contained in the matrix of the sintered friction material in a form of particles or agglomerates. Fe increases a strength of the matrix, increasing the wear resistance of the sintered friction material. In addition, Fe increases the coefficient of friction of the sintered friction material through seizure. A content of Fe in the raw material powder is preferably more than 0% and 20.0% or less in mass percent.

The balance of the raw material powder for the sintered friction material is impurities. Here, the impurities mean substances that are mixed from raw material, a producing environment, or the like when the raw material powder is produced in an industrial manner, and are allowed to be mixed within ranges in which the impurities have no adverse effect on the sintered friction material according to the present embodiment.

As described below, the sintered friction material is formed by, for example, performing pressure sintering on the raw material powder described above at 800 to 1000° C.

[Method for Identifying Chemical Composition of Sintered Friction Material]

In a case where the sintered friction material is formed by sintering the raw material powder described above, a chemical composition of the formed sintered friction material contains 40.00% or more of Cu in mass percent. A content of Cu in the sintered friction material is preferably 40.00 to 75.00%.

[Porosity of Sintered Friction Material]

Figure 10:
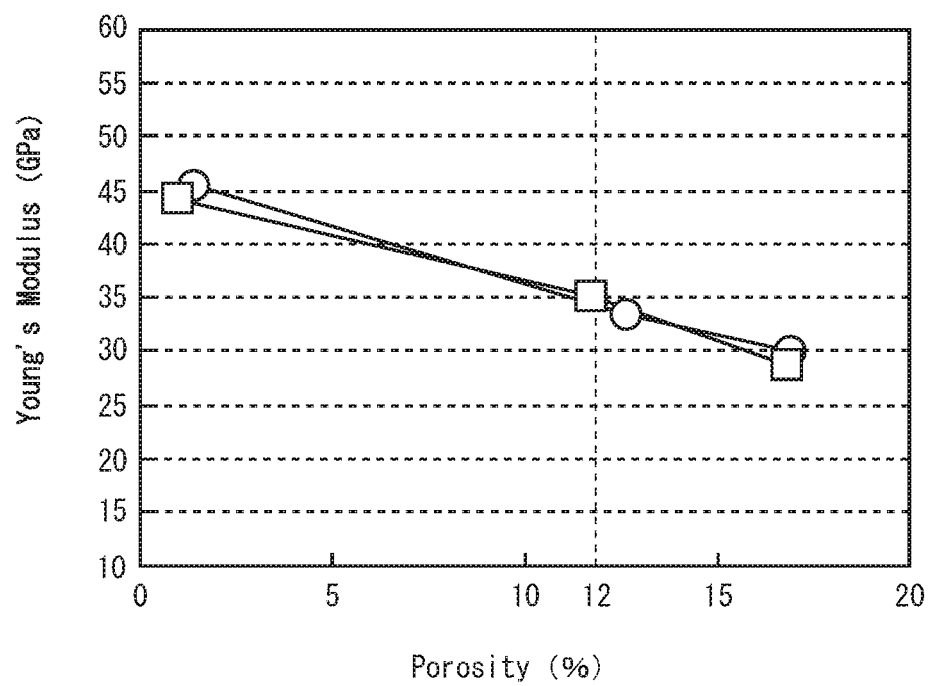
FIG. 10 is a graph illustrating relationships between porosities and the Young's moduli of sintered friction materials.

A porosity of the sintered friction material is preferably 12.0% or less. FIG. 10 is a graph illustrating relationships between porosities (%) and Young's moduli (GPa) of sintered friction materials produced from raw material powders satisfying ranges of the above-described raw material powder, which will be described below in Examples. Referring to FIG. 10, regarding the sintered friction materials, there is a negative correlation between the porosities and the Young's moduli. Specifically, as the porosities of the sintered friction materials decrease, the Young's moduli of the sintered friction materials increase. In a case where a content of Cu of a sintered friction material formed by sintering the above-described raw material powder is 40.00% or more in mass percent (preferably, ranges from 40.00 to 75.00%), a Young's modulus of the sintered friction material is 35.0 GPa or more with the porosity of the sintered friction material being 12.0% or less. The porosity is preferably 10.0% or less, more preferably 9.5% or less, still more preferably 9.0% or less.

Here, the porosity is measured based on JIS Z 2501 (2000). As illustrated in FIG. 10, the lower the porosity is, the higher the Young's modulus. Therefore, the porosity is preferably low. However, if the porosity is decreased excessively, a production cost increases. Accordingly, with consideration given to industrial production, a lower limit of the porosity is preferably 0.1%.

[Example of Method for Producing Sintered Friction Material]

The sintered friction material described above is produced by, for example, the following producing method. An example of the method for producing the sintered friction material includes a raw-material-powder producing process, a forming process, and a pressure-sintering process. The steps will be each described below.

[Raw-Material-Powder Producing Process]

The Cu powder particle described above and, as necessary, a dispersing agent are prepared. The prepared powder particle and the dispersing agent are mixed by a well-known mixer to be produced into raw material powder. Examples of the well-known mixer include a ball mill and a V-type mixer.

[Forming Process]

The produced raw material powder is formed into a predetermined shape to be produced into a green compact. For forming the raw material powder, a well-known forming method can be applied. For example, the green compact is produced by a press forming method. Specifically, a die for forming a predetermined shape is prepared. The raw material powder is charged into the die. The granular material filled into the die is pressurized by a press machine at a well-known pressure to be formed into the green compact. A forming pressure of the press machine ranges, for example, from 1.0 to 10.0 ton/cm$^2$. It suffices to perform the forming in the atmosphere.

[Pressure-Sintering Process]

A well-known pressure-sintering method is performed on the produced green compact to produce the sintered friction material. For example, the green compact is disposed on a graphite plate in a pressure sintering device. Thereafter, the graphite plates on which the green compacts are disposed are stacked and stored in a case-shaped frame on an inner peripheral surface of which a high-frequency heating coil is disposed. Thereafter, the green compacts are sintered at a predetermined sintering temperature in a sintering atmosphere while a pressure is applied to an uppermost of the graphite plates to pressurize the green compacts.

It suffices to perform the pressure sintering under well-known conditions. A sintering temperature in the pressure sintering ranges, for example, from 800 to 1000° C. A pressure applied to the green compact in the pressure sintering ranges, for example, from 2.0 to 20.0 kgf/cm$^2$. A retention time of the pressure sintering at the sintering temperature ranges from 60 to 120 minutes. An atmosphere used for the pressure sintering is a well-known atmosphere, for example, a gaseous mixture of 5 to 20% or less of H$_2$ gas and N$_2$ gas, or Ar gas.

By the pressure sintering, a neck is formed in a contact portion of the granular material in the green compact, by which the sintered friction material is produced. By adjusting a forming pressure of a press machine in the forming process and adjusting a pressure and a temperature in the pressure-sintering process, a porosity of the sintered friction material changes. Therefore, by adjusting the forming pressure of the press machine in the forming process and the pressure and the temperature in the pressure-sintering process, the porosity is adjusted, and a Young's modulus of the sintered friction material is brought to 35.0 GPa or more. It is preferable that, in a case where the content of Cu in the chemical composition of the sintered friction material is 40.00% or more (i.e., in a case where the content of Cu in the raw material powder is 40.00% or more), the forming pressure of the press machine in the forming process, and the pressure and the temperature in the pressure-sintering process are adjusted so that the porosity of the sintering friction material becomes 12.0%. This brings the Young's modulus of the sintered friction material to 35.0 GPa or more. The porosity of the sintered friction material can be brought to 12.0% or less, and the Young's modulus of the sintered friction material can be brought to 35.0 GPa or more, by adjusting the forming pressure of the press machine in the forming process, and the pressure and the temperature in the pressure-sintering process in accordance with the composition of the raw material powder.

[Other Processes]

The producing method may further include a well-known coining process and/or a well-known cutting machining process.

[Coining Process]

A coining process may be performed after the pressure-sintering process. In the coining process, the sintered friction material after the pressure-sintering process is subjected to cold pressurization, by which a shape of the sintered friction material is adjusted.

[Cutting Machining Step]

A cutting machining step may be performed after the pressure-sintering step or after the coining step. In the cutting machining step, the sintered friction material is subjected to cutting machining to have a desired shape.

Through the producing method, the sintered friction material in the present embodiment is produced.

The chemical composition of the sintered friction material according to the present embodiment is not limited to the composition described above. The Young's modulus of the sintered friction material can be adjusted with the chemical composition and the porosity. Therefore, as long as the sintered friction material in the present embodiment has a Young's modulus of 35.0 GPa or more, no particular limitations are imposed on the chemical composition and the porosity of the sintered friction material.

[Method for Producing a Brake Lining for a Railway Vehicle]

One or more sintered friction materials produced by the producing method are attached to a base plate with friction material supporting mechanisms interposed therebetween. For example, as illustrated in FIG. 7 and FIG. 8, the sintered friction material 20 is coupled to the base plate 40 with the friction material supporting mechanism 30, by which the sintered friction material 20 is supported. Through the producing method described above, the brake lining 10 for a railway vehicle is produced.

EXAMPLES

Production of friction materials having Young's moduli of 35.0 GPa or more was attempted. Raw material powders having chemical compositions shown in Table 1 were prepared.

TABLE 1

| | Composition (mass %) | | | | | | | | | | | | Forming Process | Sintering Process | | | | |
|---|---|---|---|---|---|---|---|---|---|---|---|---|---|---|---|---|---|---|
| Test No. | Cu | Graphite | Mica | SUS 316 | FeCr | FeW | Zircon Sand | Mullite | Silica | VC | W | Fe | Pressure (ton/cm²) | Temperature (° C.) | Pressure (kgf/cm²) | Porosity (Vol. %) | Density (g/cm³) | Young's Modulus (GPa) |
| 1 | 64.72 | 12.25 | | | 4.9 | 9.8 | 4.9 | | 1.47 | 1.96 | | | 4.0 | 950 | 10.0 | 6.7 | 5.6 | 44.1 |
| 2 | 62.00 | 11.00 | 0.5 | 5.4 | 5.4 | 5.4 | 7.0 | 1.8 | 1.50 | | | | 4.0 | 950 | 10.0 | 14.9 | 4.9 | 25.9 |
| 3 | 62.40 | 10.70 | | | 3.4 | | 3.6 | | 1.10 | 2.00 | 10.0 | 6.8 | 2.0 | 950 | 10.0 | 16.9 | 5.1 | 29.9 |
| 4 | 62.40 | 10.70 | | | 3.4 | | 3.6 | | 1.10 | 2.00 | 10.0 | 6.8 | 3.0 | 950 | 10.0 | 12.6 | 5.4 | 33.5 |
| 5 | 62.40 | 10.70 | | | 3.4 | | 3.6 | | 1.10 | 2.00 | 10.0 | 6.8 | 6.0 | 950 | 10.0 | 1.4 | 6.0 | 45.4 |
| 6 | 67.00 | 11.50 | | | 5.0 | | 5.0 | | 1.50 | | | 10.0 | 2.0 | 950 | 10.0 | 16.8 | 4.8 | 28.7 |
| 7 | 67.00 | 11.50 | | | 5.0 | | 5.0 | | 1.50 | | | 10.0 | 3.0 | 950 | 10.0 | 11.7 | 5.0 | 35.1 |
| 8 | 67.00 | 11.50 | | | 5.0 | | 5.0 | | 1.50 | | | 10.0 | 6.0 | 950 | 10.0 | 1.0 | 5.7 | 44.2 |

Blank cells in Table 1 indicate that corresponding composites were not contained. A raw material of each test number was charged into a V-type mixer and mixed at a rotation speed of 20 to 40 rpm for 20 to 100 minutes to be produced into a raw material powder. The raw material powder of each test number was formed by the press forming method at a forming pressure (ton/cm²) shown in Table 1 to be produced into a green compact. The pressure sintering was performed on the produced green compact to produce a sintered friction material of each test number.

Specifically, the green compacts were disposed on graphite plates. Thereafter, the graphite plates on which the green compacts were disposed were stacked and stored in a case-shaped frame on an inner peripheral surface of which a high-frequency heating coil was disposed. The green compacts were sintered by heating the green compacts at a heating temperature (° C.) shown in Table 1 for 60 minutes and pressurizing the green compacts at a pressure (kgf/cm²) shown in Table 1, to be produced into sintered friction materials. An atmosphere in the frame during the pressure sintering was a gaseous mixture of 5 to 10% of $H_2$ gas and $N_2$ gas. Through the above producing process, the sintered friction materials were produced.

Porosities, densities, and Young's moduli of the produced sintered friction materials were measured. The porosities were measured in accordance with a method conforming to JIS Z 2501 (2000). The Young's moduli were measured by the testing method for dynamic elastic modulus (bending resonance method) conforming to JIS R 1602 (1995).

Results of the measurements are shown in Table 1. As shown in Table 1, the Young's moduli of the sintered friction materials having porosities brought to 12.0% or less were 35.0 GPa or more. It is accordingly considered that, as illustrated in FIG. 1 and FIG. 2, test numbers 1, 5, 7, and 8 of which the Young's moduli were 35.0 GPa or more could reduce the brake squeal sufficiently.

The embodiment according to the present invention has been described above. However, the embodiment described above is merely an example of practicing the present invention. The present invention is therefore not limited to the embodiment described above, and the embodiment described above can be modified and practiced as appropriate without departing from the scope of the present invention.

REFERENCE SIGNS LIST 10 brake lining
20 sintered friction material
30 friction material supporting mechanism
40 base plate
201 brake disc
202 brake caliper
203 caliper arm
204 pressing mechanism

The invention claimed is:

1. A brake lining for a railway vehicle to be used for a disc brake system for the railway vehicle being capable of traveling at a speed of 260 km/h or more, the brake lining comprising:
   a base plate;
   a sintered friction material into which a plurality of powder particles are sintered; and
   a friction material supporting mechanism that is disposed between the base plate and the sintered friction material and supports the sintered friction material, wherein
   the sintered friction material has a Young's modulus of 35.0 GPa or more.

2. The brake lining for the railway vehicle according to claim 1, wherein
   the sintered friction material contains, in mass percent, 40.00% or more of Cu, and
   a porosity of the sintered friction material is 12.0% or less.

3. The brake lining for the railway vehicle according to claim 2, wherein
   the sintered friction material has a Young's modulus of 100.0 GPa or less.

4. The brake lining for the railway vehicle according to claim 3, wherein
   the friction material supporting mechanism includes an elastic member that is disposed between the base plate and the sintered friction material.

5. The brake lining for the railway vehicle according to claim 2, wherein
   the friction material supporting mechanism includes an elastic member that is disposed between the base plate and the sintered friction material.

6. The brake lining for the railway vehicle according to claim 1, wherein
   the sintered friction material has a Young's modulus of 100.0 GPa or less.

7. The brake lining for the railway vehicle according to claim 6, wherein
   the friction material supporting mechanism includes an elastic member that is disposed between the base plate and the sintered friction material.

8. The brake lining for the railway vehicle according to claim 1, wherein the friction material supporting mechanism includes an elastic member that is disposed between the base plate and the sintered friction material.

9. A disc brake system for a railway vehicle, comprising:
a brake disc that is attached to a wheel or an axle of the railway vehicle; and
a brake caliper that is attached to a bogie of the railway vehicle, wherein
the brake caliper includes:
   the brake lining for the railway vehicle according to claim 1;
   a caliper arm to which the brake lining for the railway vehicle is attached; and
   a pressing mechanism that is capable of pressing the brake lining for the railway vehicle against the brake disc.

10. A sintered friction material, wherein the sintered friction material is to be used for the brake lining for the railway vehicle according to claim 1.

* * * * *